United States Patent
Yokota et al.

(10) Patent No.: US 8,237,088 B2
(45) Date of Patent: Aug. 7, 2012

(54) TANDEM PULSE ARC WELDING CONTROL APPARATUS AND SYSTEM THEREFOR

(75) Inventors: Masahiro Yokota, Fujisawa (JP); Eiji Sato, Fujisawa (JP); Masahiro Honma, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 364 days.

(21) Appl. No.: 12/709,703

(22) Filed: Feb. 22, 2010

(65) Prior Publication Data

US 2010/0230394 A1    Sep. 16, 2010

(30) Foreign Application Priority Data

Mar. 16, 2009    (JP) .................................. 2009-062168

(51) Int. Cl.
*B23K 9/10*    (2006.01)
(52) U.S. Cl. ......... 219/130.51; 219/130.21; 219/137 PS
(58) Field of Classification Search ............. 219/130.51, 219/130.21, 137 PS, 130.31–130.33
See application file for complete search history.

(56) References Cited

U.S. PATENT DOCUMENTS

| 4,806,735 A | 2/1989 | Ditschun et al. |
| 7,064,290 B2 * | 6/2006 | Blankenship et al. ... 219/130.51 |

FOREIGN PATENT DOCUMENTS

| EP | 1 977 847 A1 | 10/2008 |
| JP | 2002-263838 | 9/2002 |
| JP | 2003-103368 A | 4/2003 |
| JP | 2003-126961 A | 5/2003 |

* cited by examiner

*Primary Examiner* — David Lam
(74) *Attorney, Agent, or Firm* — Oblon, Spivak, McClelland, Maier & Neustadt, L.L.P.

(57) ABSTRACT

A tandem pulse arc welding control apparatus includes a voltage detector; a voltage setting unit; a pulse-peak-current-reference-value setting circuit; a pulse-base-current-reference-value setting circuit; an error amplifier that calculates a pulse-peak-current variation value and a pulse-base-current variation value; an adder that calculates a pulse-peak-current value; an adder that calculates a pulse-base-current value; a pulse-waveform selection circuit that outputs the pulse-peak-current value in a pulse peak period, and that outputs the pulse-base-current value in a pulse base period; and an output control circuit that controls a current value for a second welding wire. Because an appropriate welding voltage can be obtained with this configuration, a high welding quality can be realized.

8 Claims, 9 Drawing Sheets

TANDEM PULSE ARC WELDING CONTROL APPARATUS AND SYSTEM THEREFOR

BACKGROUND OF THE INVENTION

1. Field of the Invention

The present invention relates to a tandem pulse arc welding control apparatus that controls the length of an arc in tandem pulse arc welding in which a pulse cycle for a first welding wire and a pulse cycle for a second welding wire insulated from the first welding wire are synchronized with each other, and in tandem pulse arc welding in which the pulse cycle for the first welding wire and the pulse cycle for the second welding wire are made to have a phase difference, which is set in advance, therebetween, and relates to a system therefor.

2. Description of the Related Art

Hitherto, multi-electrode arc welding apparatuses having two welding wires for one welding torch have been proposed because the multi-electrode arc welding apparatuses have advantages in that the welding speed is high, the amount of spatter that occurs is small, the welding bead has a good appearance, and so forth (for example, see Japanese Unexamined Patent Application Publication No. 2002-263838).

The invention described in Japanese Unexamined Patent Application Publication No. 2002-263838 given above is a method for controlling a multi-electrode pulse arc welding apparatus in which a pulse cycle for a first welding wire is changed, and in which a peak current value for a second welding wire is changed. Accordingly, in the invention, the average value of a welding voltage at the second welding wire is varied, thereby reducing variation in the length of an arc for the second welding wire and so forth. Thus, a high welding quality can be realized.

However, in the invention described in Japanese Unexamined Patent Application Publication No. 2002-263838 given above, there may be a case in which an appropriate welding current cannot be obtained because the range of variation in the average value of the welding voltage at the second welding wire is narrow. As a result, the invention has a problem that a high welding quality cannot be realized.

SUMMARY OF THE INVENTION

Accordingly, it is an object of the present invention to provide a tandem pulse arc welding control apparatus that can realize a high welding quality, and a system therefor.

In order to solve the above-mentioned issues, a tandem pulse arc welding control apparatus according to an aspect of the present invention is provided, in which a pulse cycle for a first welding wire and a pulse cycle for a second welding wire insulated from the first welding wire are synchronized with each other. The tandem pulse arc welding control apparatus includes the following elements: voltage detection means for detecting a voltage at the second welding wire, and for outputting a value of the voltage detected at the second welding wire; voltage-target-value setting means for outputting a voltage target value, which is set in advance, for the second welding wire; pulse-peak-output-reference-value setting means for outputting a pulse-peak-output reference value, which is set in advance, for the second welding wire; pulse-base-output-reference-value setting means for outputting a pulse-base-output reference value, which is set in advance, for the second welding wire; output-variation-value calculating means for calculating a pulse-peak-output variation value for the second welding wire and a pulse-base-output variation value for the second welding wire on the basis of a difference between the value of the voltage detected at the second welding wire and the voltage target value for the second welding wire; pulse-peak-output-value calculating means for calculating a pulse-peak-output value for the second welding wire by adding the pulse-peak-output variation value for the second welding wire to the pulse-peak-output reference value for the second welding wire; pulse-base-output-value calculating means for calculating a pulse-base-output value for the second welding wire by adding the pulse-base-output variation value for the second welding wire to the pulse-base-output reference value for the second welding wire; second pulse-waveform selection means, into which a pulse cycle signal indicating whether the first welding wire is in a pulse peak period or a pulse base period, for outputting the pulse-peak-output value for the second welding wire when the pulse cycle signal indicates the pulse peak period, and for outputting the pulse-base-output value for the second welding wire when the pulse cycle signal indicates the pulse base period; and output control means for controlling an output value for the second welding wire on the basis of the pulse-peak-output value for the second welding wire and the pulse-base-output value for the second welding wire, which have been output by the second pulse-waveform selection means.

With this configuration, the tandem pulse arc welding control apparatus can control the pulse-peak-output value for the second welding wire and the pulse-base-output value for the second welding wire. Accordingly, the tandem pulse arc welding control apparatus can increase the range of variation in an average value of the welding voltage at the second welding wire, for example, compared with a case in which only the pulse-peak-output value for the second welding wire is controlled. For example, there may be a case in which a sufficient average value of the welding voltage at the second welding wire cannot be obtained simply by increasing the pulse-peak-output value for the second welding wire, so that the average value of the welding voltage at the second welding wire is too low. Even in such a case, the tandem pulse arc welding control apparatus increases the pulse-base-output value for the second welding wire, thereby increasing the average value of the welding voltage at the second welding wire. Thus, the tandem pulse arc welding control apparatus can obtain an appropriate welding voltage.

Note that, in the tandem pulse arc welding control apparatus having the above-described configuration, regarding comparison between the value of the voltage detected at the second welding wire and the voltage target value for the second welding wire, the comparison may be performed for an average voltage determined using both a peak voltage and a base voltage. Alternatively, a target value may be set for each of the peak voltage and the base voltage, and the target value for the peak voltage and the target value for the base voltage may be compared with a value of a detected peak voltage and a value of a detected base voltage, respectively.

Furthermore, here, synchronization between the pulse cycle for the first welding wire and the pulse cycle for the second welding wire includes a case in which the pulse cycles having a predetermined phase difference therebetween are synchronized with each other.

In the tandem pulse arc welding control apparatus having the above-described configuration, control of outputting a value to the second welding wire can be performed using a current value. In other words, the tandem pulse arc welding control apparatus can be configured so that: the pulse-peak-output reference value for the second welding wire is a pulse-peak-current reference value for the second welding wire; the pulse-base-output reference value for the second welding wire is a pulse-base-current reference value for the second welding wire; the pulse-peak-output variation value for the second welding wire is a pulse-peak-current variation value for the second welding wire; the pulse-base-output variation value for the second welding wire is a pulse-base-current variation value for the second welding wire; the pulse-peak-output value for the second welding wire is a pulse-peak-current value for the second welding wire; the pulse-base-output value for the second welding wire is a pulse-base-current value for the second welding wire; and the output value for the second welding wire is a current value for the second welding wire.

In the tandem pulse arc welding control apparatus having the above-described configuration, control of outputting a value to the second welding wire can be performed using a voltage value. In other words, the tandem pulse arc welding control apparatus can be configured so that: the pulse-peak-output reference value for the second welding wire is a pulse-peak-voltage reference value for the second welding wire; the pulse-base-output reference value for the second welding wire is a pulse-base-voltage reference value for the second welding wire; the pulse-peak-output variation value for the second welding wire is a pulse-peak-voltage variation value for the second welding wire; the pulse-base-output variation value for the second welding wire is a pulse-base-voltage variation value for the second welding wire; the pulse-peak-output value for the second welding wire is a pulse-peak-voltage value for the second welding wire; the pulse-base-output value for the second welding wire is a pulse-base-voltage value for the second welding wire; and the output value for the second welding wire is a voltage value for the second welding wire.

In the tandem pulse arc welding control apparatus having the above-described configuration, the pulse cycle for the first welding wire and the pulse cycle for the second welding wire may be made to have a phase difference, which is set in advance, therebetween. The pulse cycle signal, which indicates whether the first welding wire is in the pulse peak period or the pulse base period, may be made to have the phase difference, and may be input to the second pulse-waveform selection means.

With this configuration, because the phase cycle for the second welding wire has the phase difference, which is set in advance, with respect to the phase cycle for the first welding wire, occurrence of attraction of an arc for the second welding wire and an arc for the first welding wire to each other is reduced. Thus, a higher welding quality is realized.

In the tandem pulse arc welding control apparatus having the above-described configuration, the output-variation-value calculating means may calculate, as each of the pulse-peak-output variation value for the second welding wire and the pulse-base-output variation value for the second welding wire, a multiplication value, which is obtained by multiplying the difference between the value of the voltage detected at the second welding wire and the voltage target value for the second welding wire by a constant that is set in advance, an integral value, which is obtained by integrating the multiplication values with respect to time, or an addition value, which is obtained by adding the multiplication value to the integral value.

With this configuration, the tandem pulse arc welding control apparatus can calculate appropriate values as the pulse-peak-output variation value for the second welding wire and the pulse-base-output variation value for the second welding wire. Thus, the tandem pulse arc welding control apparatus can control the welding voltage.

In the tandem pulse arc welding control apparatus having the above-described configuration, the pulse-peak-output-reference-value setting means may output the pulse-peak-output reference value that is set in advance on the basis of properties of a material of the second welding wire, a diameter of the second welding wire, a type of shielding gas, the voltage target value for the second welding wire, a speed at which the second welding wire is fed, or the pulse cycle for the first welding wire. The pulse-base-output-reference-value setting means may output the pulse-base-output reference value that is set in advance on the basis of the properties of the material of the second welding wire, the diameter of the second welding wire, the type of shielding gas, the voltage target value for the second welding wire, at the speed at which the second welding wire is fed, or the pulse cycle for the first welding wire.

With this configuration, the tandem pulse arc welding control apparatus can set the pulse-peak-output reference value for the second welding wire and the pulse-base-output reference value for the second welding wire to appropriate values. Thus, the tandem pulse arc welding control apparatus can control the welding voltage.

In the tandem pulse arc welding control apparatus having the above-described configuration, the output control means may vary a value of a welding voltage at the second welding wire by controlling the pulse-peak-output value and the pulse-base-output value for the second welding wire, thereby controlling a length of an arc for the second welding wire.

With this configuration, the tandem pulse arc welding control apparatus can appropriately control the length of the arc for the second welding wire. Thus, a high welding quality can be realized.

Furthermore, a tandem pulse arc welding system according to an aspect of the present invention includes the following elements: a welding robot including a first welding wire and a second welding wire that is insulated from the first welding wire; a welding robot controller that controls the welding robot; welding power supplies that supply welding voltages to the first welding wire and the second welding wire; and the tandem pulse arc welding control apparatus having the above-described configuration that controls the welding voltage which has been output by the corresponding welding power supply to the second welding wire.

DESCRIPTION OF THE PREFERRED EMBODIMENTS

Figure 1:
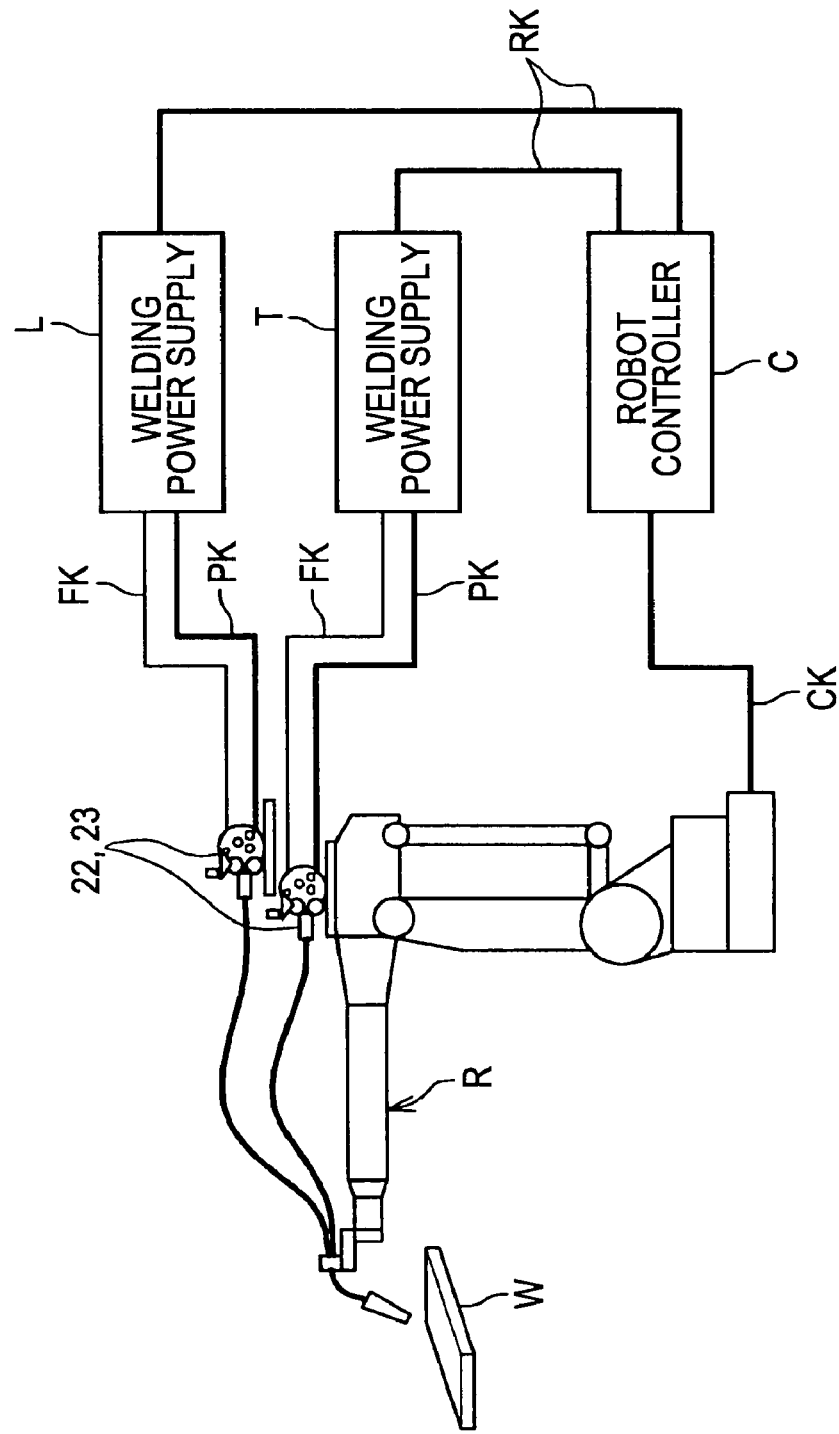
FIG. 1 is a schematic diagram illustrating an overview of a tandem pulse arc welding system according to a first embodiment of the present invention.

Hereinafter, embodiments of the present invention will be described in detail appropriately with reference to the drawings. Note that, in each of the embodiments, means having the same function, circuits that are the same as each other, and members that are the same as each other are denoted by the same reference numerals, and descriptions thereof are omitted.

First Embodiment

Control of Current and Synchronous Processing

[Overview of Tandem Pulse Arc Welding System]

An overview of a tandem pulse arc welding system according to a first embodiment will be described with reference to FIGS. 1 and 2.

A tandem pulse arc welding system 100 performs tandem pulse arc welding in which a pulse cycle for a first welding wire 19a and a pulse cycle for a second welding wire 19b insulated from the first welding wire 19a are synchronized with each other. As illustrated in FIG. 1, the tandem pulse arc welding system 100 includes a welding robot R, welding power supplies L and T, and a robot controller C.

The robot controller C controls the welding robot R that is described below. Here, the robot controller C outputs a control signal via a robot control cable CK to the welding robot R. Furthermore, the robot controller C outputs a wire-feeding-speed command (LWR) and a wire-feeding-speed command (TWR) via welding-power-supply control cables RK to the welding power supplies L and T, respectively.

The welding power supplies L and T supply welding voltages via power cables PK to the first welding wire 19a and the second welding wire 19b, respectively. Furthermore, the welding power supplies L and T apply motor voltages via feeder cables FK to wire feeding motors 22a and 22b that are described below, respectively.

The welding robot R is an arc welding robot such as a vertical articulated robot having a six-axis configuration. Here, regarding the welding robot R, the wire feeding motors (22a and 22b) and wire feeding rollers 23 (23a and 23b) illustrated in FIG. 2 are attached to wrist portions thereof. The wire feeding motor 22a feeds the first welding wire 19a via the wire feeding roller 23a. Furthermore, the wire feeding roller 23a is, for example, a roller constituting two rollers which are disposed so that the first welding wire 19a is sandwiched therebetween. Additionally, the wire feeding motor 22b feeds the second welding wire 19b via the wire feeding roller 23b. Moreover, the wire feeding roller 23b is, for example, a roller constituting two rollers which are disposed so that the second welding wire 19b is sandwiched therebetween. Although the wire feeding motors 22 and the wire feeding rollers 23 are illustrated in such a manner that they are vertically disposed in FIG. 1 for description, they are attached in parallel at the left and right sides on a flat portion of the welding robot R in reality.

First, the tandem pulse arc welding system 100 drives each of the wire feeding motors 22a and 22b by supplying power, thereby supplying a corresponding one of the first welding wire 19a and the second welding wire 19b. Then, the tandem pulse arc welding system 100 forms an arc between the supplied first welding wire 19a and a base metal W and an arc between the supplied second welding wire 19b and the base metal W, thereby performing tandem pulse arc welding. In this case, the tandem pulse arc welding system 100 controls outputting of a welding current, thereby controlling the length of the arc for the second welding wire 19b. Note that, in each of the embodiments given below, the first welding wire 19a is a leading electrode, and the second welding wire 19b is a trailing electrode.

[Configuration of Tandem Pulse Arc Welding Control Apparatus]

Hereinafter, configurations of tandem pulse arc welding control apparatuses will be described with reference to FIG. 2. As illustrated in FIG. 2, tandem pulse arc welding control apparatuses 3a and 3b include waveform control sections 1 and 1a, power circuit sections 2a and 2b, wire-feeding-speed setting sections 20a and 20b, and wire-feeding-motor control circuits 21a and 21b, respectively. Here, the tandem pulse arc welding control apparatus 3a illustrated in FIG. 2 corresponds to the welding power supply L illustrated in FIG. 1, and the tandem pulse arc welding control apparatus 3b illustrated in FIG. 2 corresponds to the welding power supply T illustrated in FIG. 1.

<Tandem Pulse Arc Welding Control Apparatus: First Welding Wire (Leading Electrode) Side>

The power circuit section 2a includes a three-phase alternating-current power supply 11a, a rectifier 12a, a smoothing capacitor 13a, an inverter 14a, a transformer 15a, a rectifier 16a, and a reactor 17a.

The three-phase alternating-current power supply 11a supplies three-phase alternating currents.

The rectifier 12a rectifies (converts), to (into) a direct current, the three-phase alternating currents that have been supplied from the three-phase alternating-current power supply 11a.

The smoothing capacitor 13a smoothes the direct current that has been obtained by rectification performed by the rectifier 12a, i.e., smoothes ripples (waves) included in the direct current.

The inverter 14a converts, into an alternating current, the direct current that has been smoothed by the smoothing capacitor 13a, and varies, in accordance with a current-error amplification signal supplied from the waveform control section 1a, a welding current flowing through the first welding wire 19a.

The transformer 15a transforms the voltage of the alternating current that has been output from the inverter 14a.

The rectifier 16a rectifies (converts), to (into) a direct current again, the alternating current whose voltage has been transformed by the transformer 15a.

The reactor 17a smoothes the direct current that has been obtained by rectification performed by the rectifier 16a, i.e., smoothes ripples included in the direct current.

The wire-feeding-speed setting section 20a outputs, in accordance with the wire-feeding-speed command (LWR), a feeding-speed setting signal indicating a speed at which the first welding wire 19a is fed.

The wire-feeding-motor control circuit 21a controls, in accordance with the feeding-speed setting signal for the first welding wire 19a that has been output from the wire-feeding-speed setting section 20a, driving of the wire feeding motor 22a.

<Tandem Pulse Arc Welding Control Apparatus: Second Welding Wire (Trailing Electrode) Side>

The power circuit section 2b includes a three-phase alternating-current power supply 11b, a rectifier 12b, a smoothing capacitor 13b, an inverter 14b, a transformer 15b, a rectifier 16b, and a reactor 17b.

The three-phase alternating-current power supply 11b supplies three-phase alternating currents.

The rectifier 12b rectifies (converts), to (into) a direct current, the three-phase alternating currents that have been supplied from the three-phase alternating-current power supply 11b.

The smoothing capacitor 13b smoothes the direct current that has been obtained by rectification performed by the rectifier 12b, i.e., smoothes ripples included in the direct current.

The inverter 14b converts, into an alternating current, the direct current that has been smoothed by the smoothing capacitor 13b, and controls, in accordance with a current-error amplification signal supplied from the waveform control section 1, the welding current flowing through the second welding wire 19b.

The transformer 15b transforms the voltage of the alternating current that has been output from the inverter 14b.

The rectifier 16b rectifies, to a direct current again, the alternating current whose voltage has been transformed by the transformer 15b. The reactor 17b smoothes the direct current that has been obtained by rectification performed by the rectifier 16b, i.e., smoothes ripples included in the direct current.

The wire-feeding-speed setting section 20b outputs, in accordance with the wire-feeding-speed command (TWR), a feeding-speed setting signal indicating a speed at which the second welding wire 19b is fed.

The wire-feeding-motor control circuit 21b controls, in accordance with the feeding-speed setting signal for the second welding wire 19b that has been output from the wire-feeding-speed setting section 20b, driving of the wire feeding motor 22b.

[Configuration of Waveform Control Section]
<Waveform Control Section: First Welding Wire (Leading Electrode) Side>

Hereinafter, a configuration of the waveform control section 1a will be described in detail.

Figure 2:
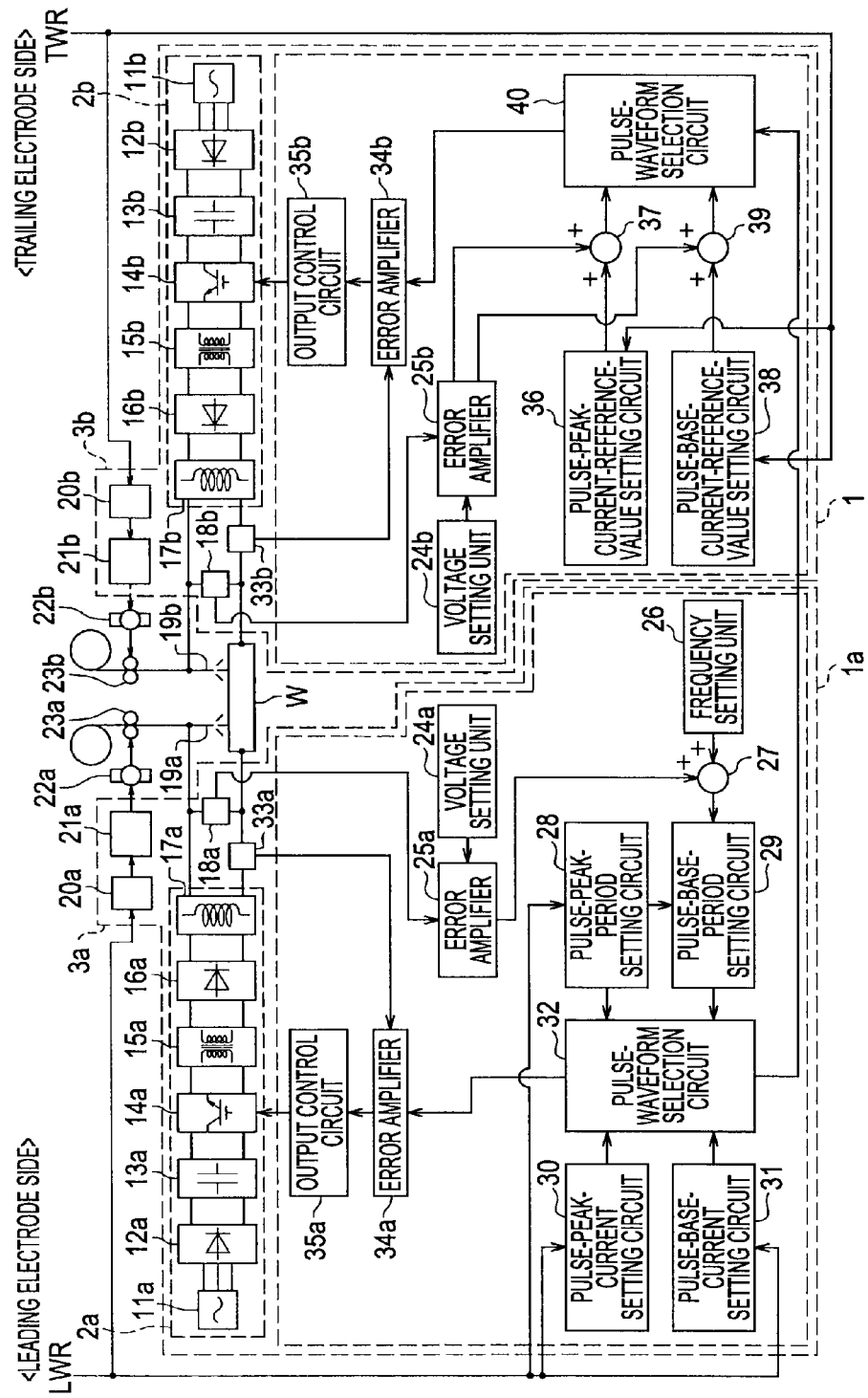
FIG. 2 is a block diagram of configurations of tandem pulse arc welding control apparatuses according to the first embodiment of the present invention.

As illustrated in FIG. 2, the waveform control section 1a includes a voltage detector 18a, a voltage setting unit 24a, an error amplifier 25a, a frequency setting unit 26, an adder 27, a pulse-peak-period setting circuit 28, a pulse-base-period setting circuit 29, a pulse-peak-current setting circuit 30, a pulse-base-current setting circuit 31, a pulse-waveform selection circuit (first pulse-waveform selection circuit) 32, a current detector 33a, an error amplifier 34a, and an output control circuit 35a.

The voltage detector 18a detects the welding voltage at the first welding wire 19a, and outputs, to the error amplifier 25a, a voltage detection signal indicating a value of the voltage detected at the first welding wire 19a.

The voltage setting unit 24a outputs, to the error amplifier 25a, a voltage setting signal indicating a voltage target value, which is set in advance, for the first welding wire 19a.

The error amplifier 25a amplifies the error between the voltage detection signal, which has been output by the voltage detector 18a, and the voltage setting signal, which has been output by the voltage setting unit 24a, and outputs, to the adder 27, the amplified error as a voltage-error amplification signal.

Here, regarding how to determine a voltage error, an average voltage determined using both a peak voltage and a base voltage may be detected, and the average voltage may be compared with a target value of the average voltage. Alternatively, a target value may be set for each of the peak voltage and the base voltage, a value of a detected peak voltage may be compared with a peak-voltage target value, and a value of a detected base voltage may be compared with a base-voltage target value. This is similarly applied to second to fourth embodiments that are described below.

The frequency setting unit 26 outputs, to the adder 27, a pulse-frequency setting signal indicating a target value of a pulse frequency for the first welding wire 19a.

The adder 27 performs V/F (voltage/frequency) conversion using the voltage-error amplification signal, which has been output by the error amplifier 25a, and the pulse-frequency setting signal, which has been output by the frequency setting unit 26, to obtain a V/F conversion signal. The adder 27 outputs the V/F conversion signal. Here, an example is described, in which the adder 27 performs V/F conversion. However, the above-described error amplifier 25a may perform V/F conversion.

The pulse-peak-period setting circuit 28 outputs, to the pulse-base-period setting circuit 29 and the pulse-waveform selection circuit 32, a pulse-peak-period setting signal, which is set in advance, for the first welding wire 19a. The pulse-peak-period setting signal for the first welding wire 19a indicates a period (time) in which a pulse peak current is caused to flow through the first welding wire 19a.

The pulse-base-period setting circuit 29 performs pulse-frequency modulation control in accordance with the pulse-peak-period setting signal, which has been output by the pulse-peak-period setting circuit 28, and the V/F conversion signal, which has been output by the adder 27, to obtain a pulse cycle signal. The pulse-base-period setting circuit 29 outputs the pulse cycle signal.

More specifically, when the level of the V/F conversion signal changes from a low level to a high level, the pulse-base-period setting circuit 29 outputs, to the pulse-waveform selection circuit 32, the pulse cycle signal indicating a pulse peak period that is the period indicated by the pulse-peak-period setting signal. Furthermore, after the pulse-peak-period, the pulse-base-period setting circuit 29 outputs, to the pulse-waveform selection circuit 32, the pulse cycle signal indicating a pulse base period. In other words, the pulse cycle signal indicates whether the first welding wire 19a is in the pulse peak period or the pulse base period.

The pulse-peak-current setting circuit 30 outputs, to the pulse-waveform selection circuit 32, a pulse-peak-current-reference-value setting signal indicating a pulse-peak-current reference value, which is set in advance, for the first welding wire 19a. The pulse-peak-current-reference-value setting signal for the first welding wire 19a indicates a reference value of the welding current flowing through the first welding wire 19a in the pulse peak period.

The pulse-base-current setting circuit 31 outputs, to the pulse-waveform selection circuit 32, a pulse-base-current-reference-value setting signal indicating a pulse-base-current reference value, which is set in advance, for the first welding wire 19a. The pulse-base-current-reference-value setting signal for the first welding wire 19a indicates a reference value of the welding current flowing through the first welding wire 19a in the pulse base period.

The pulse-waveform selection circuit (first pulse-waveform selection means) 32 outputs, to a pulse-waveform selection circuit 40, the pulse cycle signal that has been output by the pulse-base-period setting circuit 29. Here, when the pulse cycle signal indicates the pulse peak period for the first welding wire 19a, the pulse-waveform selection circuit 32 outputs, to the error amplifier 34a, the pulse-peak-current-reference-value setting signal, which has been output by the pulse-peak-current setting circuit 30, as a current control setting signal for the first welding wire 19a. In contrast, when the pulse cycle signal indicates the pulse base period for the first welding wire 19a, the pulse-waveform selection circuit 32 outputs, to the error amplifier 34a, the pulse-base-current-reference-value setting signal, which has been output by the pulse-base-current setting circuit 31, as the current control setting signal for the first welding wire 19a.

The current detector 33a detects the welding current flowing through the first welding wire 19a, and outputs, to the error amplifier 34a, a current detection signal indicating a value of the detected current flowing through the first welding wire 19a.

The error amplifier 34a amplifies the error between the current detection signal, which has been output by the current detector 33a, and the current control setting signal, which has been output by the pulse-waveform selection circuit 32, and outputs, to the output control circuit 35a, the amplified error as the current-error amplification signal.

The output control circuit 35a outputs the current-error amplification signal, which has been output by the error amplifier 34a, to the inverter 14a. Here, by outputting the current-error amplification signal to the inverter 14a, the output control circuit 35a causes the inverter 14a to vary the welding current, i.e., controls the welding current flowing through the first welding wire 19a.

When the wire-feeding-speed command (LWR) is input from the robot controller C, the pulse-peak-period setting circuit 28, the pulse-peak-current setting circuit 30, and the pulse-base-current setting circuit 31 may output the various types of signals in accordance with the wire-feeding-speed command.

<Waveform Control Section: Second Welding Wire (Trailing Electrode) Side>

Hereinafter, a configuration of the waveform control section 1 will be described in detail.

As illustrated in FIG. 2, the waveform control section 1 includes a voltage detector (voltage detection means) 18b, a voltage setting unit (voltage-target-value setting means) 24b, an error amplifier (current-variation-value calculating means) 25b, a current detector 33b, an error amplifier 34b, an output control circuit (output control means) 35b, a pulse-peak-current-reference-value setting circuit (pulse-peak-output-reference-value setting means) 36, an adder (pulse-peak-output-value calculating means) 37, a pulse-base-current-reference-value setting circuit (pulse-base-output-reference-value setting means) 38, an adder (pulse-base-output-value calculating means) 39, and the pulse-waveform selection circuit (second pulse-waveform selection means) 40.

The voltage detector 18b detects the welding voltage at the second welding wire 19b, and outputs to the error amplifier 25b, a voltage detection signal indicating a value of the voltage detected at the second welding wire 19b.

The voltage setting unit 24b outputs, to the error amplifier 25b, a voltage setting signal indicating a voltage target value, which is set in advance, for the second welding wire 19b.

The error amplifier 25b calculates, on the basis of the error between the value of the voltage detected at the second welding wire 19b and the voltage target value for the second welding wire 19b, a pulse-peak-current variation value for the second welding wire 19b and a pulse-base-current variation value for the second welding wire 19b. Here, the error amplifier 25b calculates a pulse-peak-current variation value for the second welding wire 19b on the basis of the error between the voltage detection signal, which has been output by the voltage detector 18b, and the voltage setting signal, which has been output by the voltage setting unit 24b. The error amplifier 25b outputs, to the adder 37, a pulse-peak-current-variation-value signal indicating the pulse-peak-current variation value. Furthermore, the error amplifier 25b calculates a pulse-base-current variation value for the second welding wire 19b on the basis of the error between the voltage detection signal, which has been output by the voltage detector 18b, and the voltage setting signal, which has been output by the voltage setting unit 24b. The error amplifier 25b outputs, to the adder 39, a pulse-base-current-variation-value signal indicating the pulse-base-current variation value.

In this case, the error amplifier 25b may calculate, as the pulse-peak-current variation value for the second welding wire 19b, a multiplication value (see Equation (1)), which is obtained by multiplying the error between the value of the voltage detected at the second welding wire 19b and the voltage target value for the second welding wire 19b by a constant that is set in advance, an integral value (see Equation (2)), which is obtained by integrating the multiplication values with respect to time, or an addition value (see Equation (3)), which is obtained by adding the multiplication value to the integral value.

$$\Delta Ip2 = \alpha_1(Vf2 - V2set) \quad (1)$$

$$\Delta Ip2 = \alpha_2 \int (Vf2 - V2set)dt \quad (2)$$

$$\Delta Ip2 = \alpha_3(Vf2 - V2set) + \alpha_4 \int (Vf2 - V2set)dt \quad (3)$$

Note that $\Delta Ip2$ is the pulse-peak-current variation value for the second welding wire 19b. $Vf2$ is the value of the voltage detected at the second welding wire 19b. $V2set$ is the voltage target value for the second welding wire 19b. $\alpha_1$ to $\alpha_4$ are constants. Furthermore, t denotes a time that has elapsed after control of the length of the arc started. In other words, $\int dt$ corresponds to time integral in the present invention. Regarding the constants $\alpha_1$ to $\alpha_4$, for example, welding experiments are performed, and the constants $\alpha_1$ to $\alpha_4$ are calculated in consideration of the amount of spatter that occurs and the stability of arc welding.

Furthermore, in this case, the error amplifier 25b may calculate, as the pulse-base-current variation value for the second welding wire 19b, a multiplication value (see Equation (4)), which is obtained by multiplying the error between the value of the voltage detected at the second welding wire 19b and the voltage target value for the second welding wire 19b by a constant that is set in advance, an integral value (see Equation (5)), which is obtained by integrating the multiplication values with respect to time, or an addition value (see Equation (6)), which is obtained by adding the multiplication value to the integral value.

$$\Delta Ib2 = \beta_1(Vf2 - V2set) \quad (4)$$

$$\Delta Ib2 = \beta_2 \int (Vf2 - V2set)dt \quad (5)$$

$$\Delta Ib2 = \beta_3(Vf2 - V2set) + \beta_4 \int (Vf2 - V2set)dt \quad (6)$$

Note that $\Delta Ib2$ is the pulse-base-current variation value for the second welding wire 19b. $\beta_1$ to $\beta_4$ are constants. Furthermore, t denotes a time that has elapsed after control of the length of the arc started. In other words, $\int dt$ corresponds to time integral in the present invention. The constants $\beta_1$ to $\beta_4$ can be calculated as in the case of the above-described constants $\alpha_1$ to $\alpha_4$, and may be values the same as the constants $\alpha_1$ to $\alpha_4$. Alternatively, the constants $\beta_1$ to $\beta_4$ may be values different from the constants $\alpha_1$ to $\alpha_4$.

The pulse-peak-current-reference-value setting circuit 36 outputs a pulse-peak-current reference value, which is set in advance, for the second welding wire 19b. Here, the pulse-peak-current-reference-value setting circuit 36 outputs, to the adder 37, a pulse-peak-current-reference-value setting signal indicating the pulse-peak-current reference value for the second welding wire 19b. The pulse-peak-current-reference-value setting signal for the second welding wire 19b indicates a reference value of the welding current flowing through the second welding wire 19b in the pulse peak period.

Here, regarding the pulse-peak-current reference value, for example, welding experiments are performed, and the pulse-peak-current reference value is calculated in consideration of the amount of spatter that occurs and the easiness of arc welding. More specifically, the pulse-peak-current reference value is calculated on the basis of the properties of a material of the second welding wire 19b, the diameter of the second welding wire 19b, the type of shielding gas (for example, carbon dioxide gas, argon gas, a mixture gas of carbon dioxide gas and argon gas), the voltage target value for the second welding wire 19b, the speed at which the second welding wire 19b is fed, or the pulse cycle for the first welding wire 19a.

The adder 37 adds the pulse-peak-current variation value for the second welding wire 19b to the pulse-peak-current reference value for the second welding wire 19b, thereby calculating a pulse-peak-current value for the second welding wire 19b. Here, the adder 37 adds the pulse-peak-current-reference-value setting signal, which has been output by the pulse-peak-current-reference-value setting circuit 36, to the pulse-peak-current-variation-value signal, which has been output by the error amplifier 25b. The adder 37 outputs, to the pulse-waveform selection circuit 40, a pulse-peak-current setting signal indicating the pulse-peak-current value.

The pulse-base-current-reference-value setting circuit 38 outputs a pulse-base-current reference value, which is set in advance, for the second welding wire 19b. Here, the pulse-base-current-reference-value setting circuit 38 outputs, to the adder 39, a pulse-base-current-reference-value setting signal indicating the pulse-base-current reference value for the second welding wire 19b. In this case, the pulse-base-current reference value is calculated and set as in the case of the pulse-peak-current reference value. The pulse-base-current-reference-value setting signal for the second welding wire 19b indicates a reference value of the welding current flowing through the second welding wire 19b in the pulse base period.

The adder 39 adds the pulse-base-current variation value for the second welding wire 19b to the pulse-base-current reference value for the second welding wire 19b, thereby calculating a pulse-base-current value for the second welding wire 19b. Here, the adder 39 adds the pulse-base-current-reference-value setting signal, which has been output by the pulse-base-current-reference-value setting circuit 38, to the pulse-base-current-variation-value signal, which has been output by the error amplifier 25b. The adder 39 outputs, to the pulse-waveform selection circuit 40, a pulse-base-current setting signal indicating the pulse-base-current value.

When the pulse cycle signal, which has been output by the pulse-waveform selection circuit 32, indicates the pulse peak period, the pulse-waveform selection circuit 40 outputs the pulse-peak-current value for the second welding wire 19b. In addition, when the pulse cycle signal indicates the pulse base period, the pulse-waveform selection circuit 40 outputs the pulse-base-current value for the second welding wire 19b.

Here, when the pulse cycle signal indicates the pulse peak period, the pulse-waveform selection circuit 40 outputs, to the error amplifier 34b, the pulse-peak-current setting signal, which has been output by the adder 37, as a current control setting signal for the second welding wire 19b. In contrast, when the pulse cycle signal indicates the pulse base period, the pulse-waveform selection circuit 40 outputs, to the error amplifier 34b, the pulse-base-current setting signal, which has been output by the adder 39, as the current control setting signal for the second welding wire 19b.

The current detector 33b detects the welding current flowing through the second welding wire 19b, and outputs, to the error amplifier 34b, a current detection signal indicating a value of the detected current flowing through the second welding wire 19b.

The error amplifier 34b amplifies the error between the current detection signal, which has been output by the current detector 33b, and the current control setting signal, which has been output by the pulse-waveform selection circuit 40, and outputs, to the output control circuit 35a, the amplified error as the current-error amplification signal.

The output control circuit 35b outputs the current-error amplification signal, which has been output by the error amplifier 34b, to the inverter 14b. Here, by outputting the current-error amplification signal to the inverter 14b, the output control circuit 35b causes the inverter 14b to vary the welding current, i.e., controls the welding current flowing through the second welding wire 19b. As described above, the output control circuit 35b varies an average value of the welding voltage at the second welding wire 19b by controlling a current value for the second welding wire 19b, whereby the length of the arc for the second welding wire 19b can be controlled.

When the wire-feeding-speed command (TWR) is input from the robot controller C, the pulse-peak-current-reference-value setting circuit 36 and the pulse-base-current-reference-value setting circuit 38 may output the various types of signals in accordance with the wire-feeding-speed command.

[Control of Welding Current Flowing Through Second Welding Wire (Trailing Electrode)]

Figure 3:
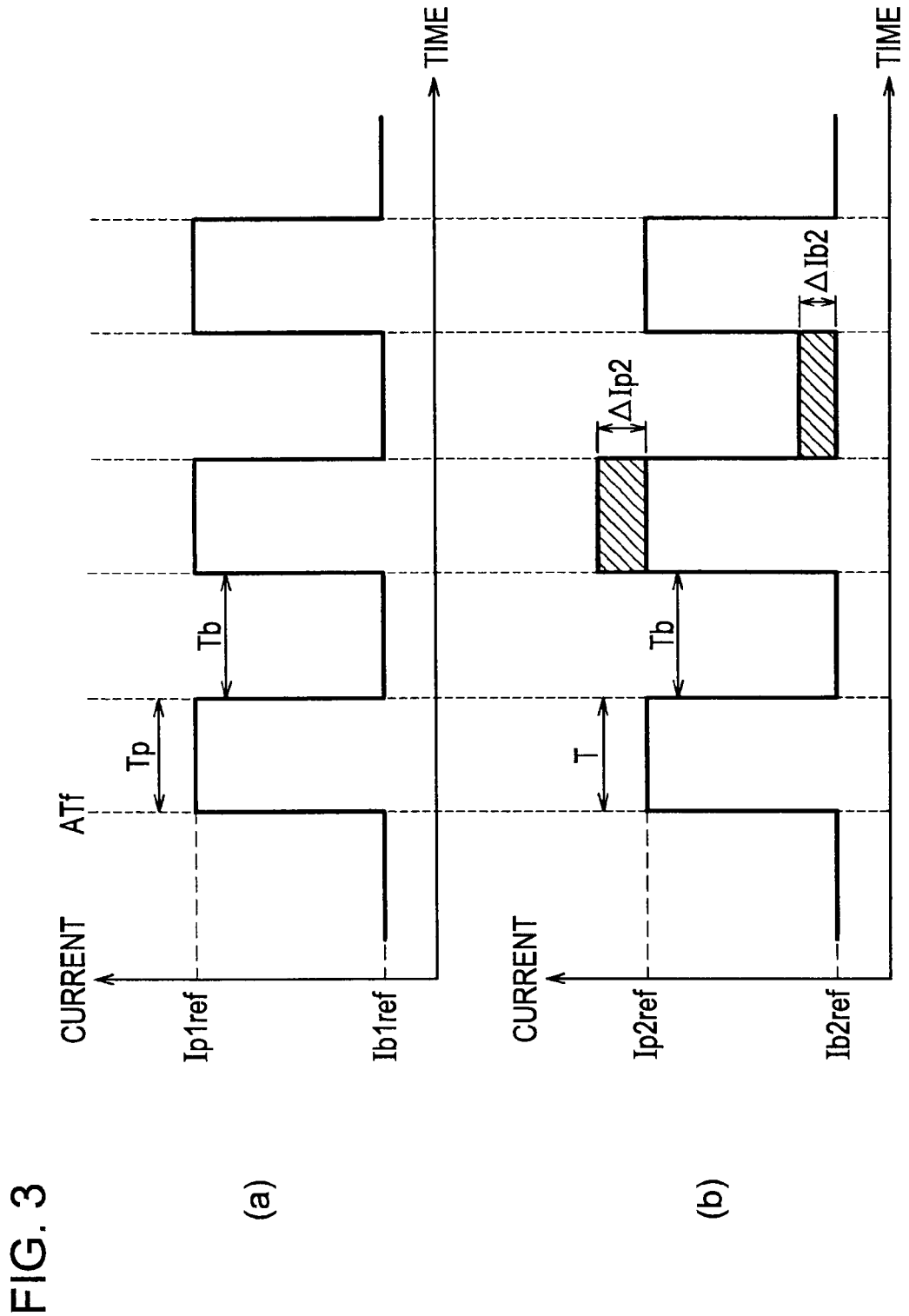
FIG. 3 includes parts (a) and (b) that are graphs for explaining control, which is performed by a waveform control section illustrated in FIG. 2, of a current flowing through a second welding wire, part (a) being a graph illustrating the relationships between a current flowing through a first welding wire and time, part (b) being a graph illustrating the relationships between the current flowing through the second welding wire and time.

Hereinafter, control of the current flowing through the second welding wire in the present invention will be described in detail with reference to FIG. 3 (appropriately with reference to FIG. 2). In FIG. 3, the pulse cycle signal is denoted by ATf. The pulse peak period is denoted by Tp. The pulse base period is denoted by Tb. The pulse-peak-current reference value for the first welding wire 19a is denoted by Ip1ref. The pulse-base-current reference value for the first welding wire 19a is denoted by Ib1ref. The pulse-peak-current reference value for the second welding wire 19b is denoted by Ip2ref. The pulse-base-current reference value for the second welding wire 19b is denoted by Ib2ref. Furthermore, in part (b) of FIG. 3, the current is increased only by the pulse-peak-current variation value $\Delta Ip2$ and the pulse-base-current variation value $\Delta Ib2$, and portions of the increased current that correspond to the pulse-peak-current variation value $\Delta Ip2$ and the pulse-base-current variation value $\Delta Ib2$ are illustrated using hatching.

As illustrated in FIG. 3, the waveform control section 1 performs control so that the pulse cycle for the second welding wire 19b will be synchronized with the pulse cycle for the first welding wire 19a at the pulse cycle signal ATf, i.e., so that the pulse peak period Tp for the first welding wire 19a will coincide with the pulse peak period Tp for the second welding wire 19b and the pulse base period Tb for the first welding wire 19a will coincide with the pulse base period Tb for the second welding wire 19b.

There is a case in which, using the waveform control section 1, it is desired to increase the average value of the welding voltage at the second welding wire 19b because of, for example, maintenance of the welding quality. However, an appropriate welding current may not be obtained simply by increasing the pulse-peak-current reference value Ip2ref for the second welding wire 19b as in the case of the related art, because the average value of the welding voltage at the second welding wire 19b is low. Furthermore, a certain upper limit of the pulse-peak-current reference value Ip2ref is defined for the second welding wire 19b, and the pulse-peak-current reference value Ip2ref cannot be unlimitedly increased. For this reason, the waveform control section 1 increases the pulse-base-current reference value Ib2ref for the second welding wire 19b only by the pulse-base-current variation value ΔIb2, thereby increasing the average value of the welding voltage at the second welding wire 19b. In this manner, the waveform control section 1 can obtain an appropriate welding current flowing through the second welding wire 19b.

The waveform control section 1 can decrease the average value of the welding voltage at the second welding wire 19b by decreasing the pulse-peak-current reference value Ip2ref for the second welding wire 19b only by the pulse-peak-current variation value ΔIp2 and by decreasing the pulse-base-current reference value Ib2ref for the second welding wire 19b only by the pulse-base-current variation value ΔIb2.

[Operation of Waveform Control Section]

Figure 4:
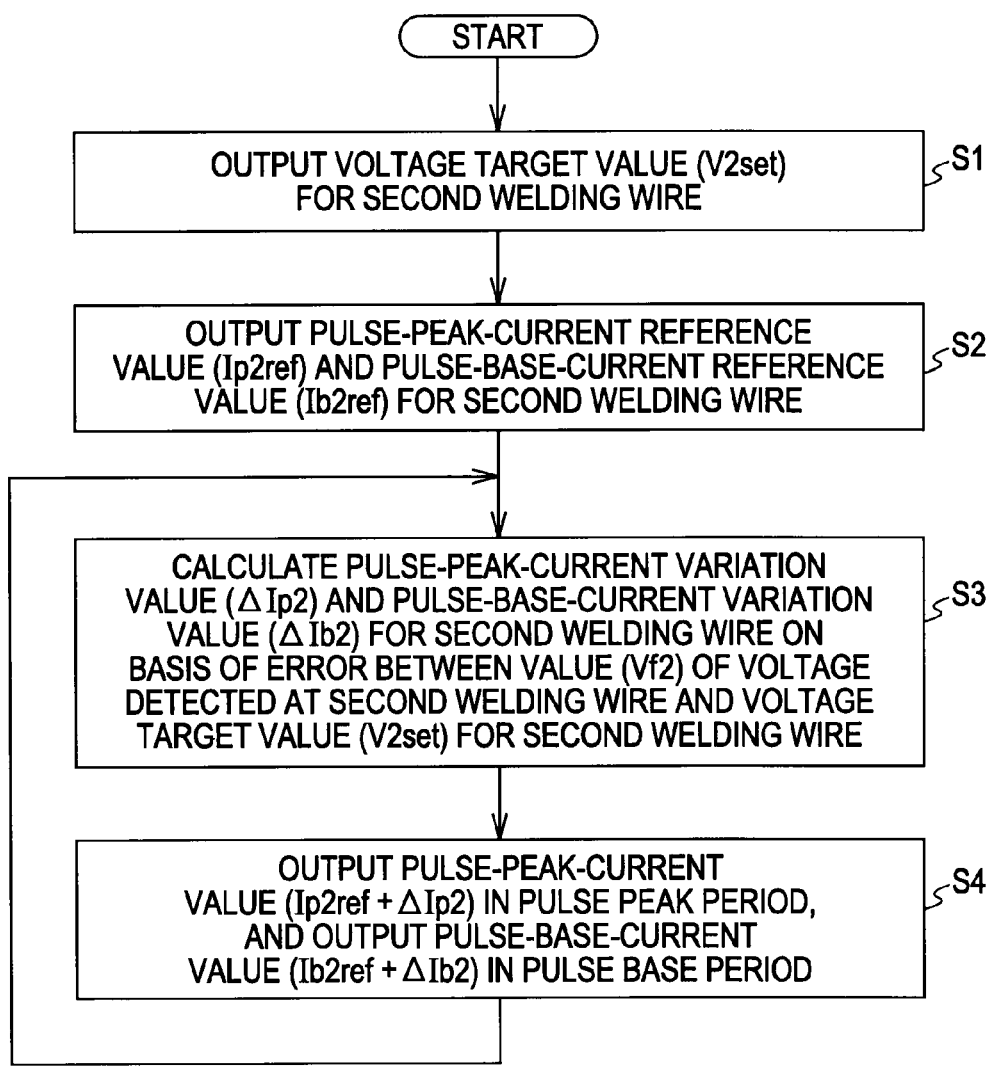
FIG. 4 is a flowchart illustrating an operation, which is performed by the waveform control section illustrated in FIG. 2, of controlling the current flowing through the second welding wire.

Hereinafter, an operation of the waveform control section 1 will be described in detail with reference to FIG. 4 (appropriately with reference to FIG. 2). The waveform control section 1 causes the voltage setting unit 24b to output the voltage target value (V2set) for the second welding wire 19b to the error amplifier 25b (step S1). Furthermore, the waveform control section 1 causes the pulse-peak-current-reference-value setting circuit 36 to output the pulse-peak-current reference value (Ip2ref) for the second welding wire 19b, and causes the pulse-peak-current-reference-value setting circuit 38 to output the pulse-base-current reference value (Ib2ref) for the second welding wire 19b (step S2).

After the process in step S2 is performed, the waveform control section 1 causes the error amplifier 25b to calculate the pulse-peak-current variation value (ΔIp2) for the second welding wire 19b and the pulse-base-current variation value (ΔIb2) for the second welding wire 19b on the basis of the error between the value (Vf2) of the voltage detected at the second welding wire 19b and the voltage target value (V2set) for the second welding wire 19b (step S3).

After the process in step S3 is performed, the waveform control section 1 causes the pulse-waveform selection circuit 40 to output the pulse-peak-current value (Ip2ref+ΔIp2) for the second welding wire 19b when the pulse cycle signal indicates the pulse peak period, and causes the pulse-waveform selection circuit 40 to output the pulse-base-current value (Ib2ref+ΔIb2) for the second welding wire 19b when the pulse cycle signal indicates the pulse base period (step S4).

As described above, the waveform control section 1 in the first embodiment controls the pulse-peak-current value for the second welding wire 19b and the pulse-base-current value for the second welding wire 19b in tandem pulse arc welding in which the pulse cycles are synchronized with each other, whereby the range of variation in the average value of the welding voltage at the second welding wire 19b can be increased. Thus, because the average value of the welding voltage at the second welding wire 19b can be optimized, a high welding quality is realized.

In the first embodiment, a case is described, in which the waveform control section 1 is included in the welding power supply T, and in which the waveform control section 1a is included in the welding power supply L. However, the first embodiment is not limited to the case. For example the waveform control sections 1 and 1a may be included in the robot controller C (not illustrated). This can be similarly applied to the following embodiments.

The above-described welding power supplies L and T (see FIG. 1) are not necessarily distinguished from each other in specification, e.g., which power supply is a welding power supply for the leading electrode or a welding power supply for the trailing electrode is not necessarily determined. For example, regarding the welding power supplies L and T, in accordance with instructions from the robot controller C, one of the welding power supplies L and T can operate as a welding power supply for the leading electrode, and the other can operate as a welding power supply for the trailing electrode. This can be similarly applied to the following embodiments.

Second Embodiment

Control of Current and Delay Processing

[Configuration of Waveform Control Section]

Regarding a configuration of a waveform control section 1B in the second embodiment, the differences between the waveform control section 1B and the waveform control section 1 in the first embodiment will be mainly described with reference to FIG. 5.

A large difference of the waveform control section 1B from the waveform control section 1 illustrated in FIG. 2 is that the pulse cycle for the first welding wire 19a and the pulse cycle for the second welding wire 19b are made to have a phase difference, which is set in advance, therebetween. Accordingly, a delay-time setting circuit 41 is added to the waveform control section 1 illustrated in FIG. 2, thereby realizing a configuration associated with the waveform control section 1B as illustrated in FIG. 5.

The delay-time setting circuit 41 outputs, to the pulse-waveform selection circuit 32B, a delay-time setting signal for adding a phase difference that is set in advance.

The pulse-waveform selection circuit 32B delays the pulse cycle signal, which has been output by the pulse-base-period setting circuit 29 so that the pulse cycle signal will be made to have the phase difference indicated by the delay-time setting signal, which has been output by the delay-time setting circuit 41. The pulse-waveform selection circuit 32B outputs the pulse cycle signal having the phase difference to a pulse-waveform selection circuit 40B. The pulse-waveform selection circuit 32B is similar to the pulse-waveform selection circuit 32 illustrated in FIG. 2 except that the pulse-waveform selection circuit 32B delays and outputs the pulse cycle signal.

Because the pulse cycle signal is made to have the phase difference and is input to the pulse-waveform selection circuit 40B, the pulse-waveform selection circuit 40B delays the current control setting signal by the phase difference, and outputs the current control setting signal to the error amplifier 34b. The pulse-waveform selection circuit 40B is similar to the pulse-waveform selection circuit 40 illustrated in FIG. 2 except that the pulse-waveform selection circuit 40B delays and outputs the current control setting signal.

Regarding the waveform control section 1B, because configurations of the individual elements except for the delay-time setting circuit 41 and the pulse-waveform selection circuit 32B are similar to those of the elements of the waveform control section 1 illustrated in FIG. 2, descriptions thereof are omitted. Furthermore, regarding the waveform control section 1B, because an operation of controlling the current flowing through the second welding wire is similar to the operation illustrated in FIG. 4, a description thereof is omitted.

As described above, the waveform control section 1B in the second embodiment controls the pulse-peak-current value for the second welding wire 19b and the pulse-base-current value for the second welding wire 19b in tandem pulse arc welding in which the pulse cycles are made to have a delay therebetween, whereby the range of variation in the average value of the welding voltage at the second welding wire 19b can be increased. Accordingly, the average value of the welding voltage at the second welding wire 19b can be optimized. Furthermore, because the waveform control section 1B delays the pulse cycle for the second welding wire 19b with respect to the pulse cycle for the first welding wire 19a, occurrence of attraction of the arc for the second welding wire 19b and the arc for the first welding wire 19a to each other is reduced. Thus, a higher welding quality is realized.

In the first and second embodiments, an example is described, in which both the pulse-peak-current value for the second welding wire 19b and the pulse-base-current value for the second welding wire 19b are controlled. However, the waveform control section in the present invention can control only either one of the pulse-peak-current value for the second welding wire 19b and the pulse-base-current value for the second welding wire 19b.

Third Embodiment

Control of Voltage and Synchronous Processing

[Configuration of Waveform Control Section]

Regarding a configuration of a waveform control section in the third embodiment, the differences between the waveform control section and the waveform control section 1 in the first embodiment will be mainly described with reference to FIG. 6. A large difference of a waveform control section 1C from the waveform control section 1 illustrated in FIG. 2 is that the waveform control section 1C controls the voltage (the welding voltage) at the second welding wire 19b instead of the current (the welding current) flowing through the second welding wire 19b.

An error amplifier (output-variation-value calculating means) 42 calculates a pulse-peak-voltage variation value for the second welding wire 19b and a pulse-base-voltage variation value for the second welding wire 19b on the basis of the error between the value of the voltage detected at the second welding wire 19b and the voltage target value for the second welding wire 19b. Here, the error amplifier 42 calculates the pulse-peak-voltage variation value for the second welding wire 19b on the basis of the error between the voltage detection signal, which has been output by the voltage detector 18b, and the voltage setting signal, which has been output by the voltage setting unit 24b. The error amplifier 42 outputs, to an adder 44, a pulse-peak-voltage-variation-value signal indicating the pulse-peak-voltage variation value. Furthermore, the error amplifier 42 calculates the pulse-base-voltage variation value for the second welding wire 19b on the basis of the error between the voltage detection signal, which has been output by the voltage detector 18b, and the voltage setting signal, which has been output by the voltage setting unit 24b. The error amplifier 42 outputs, to an adder 46, a pulse-base-voltage-variation-value signal indicating the pulse-base-voltage variation value.

In this case, the error amplifier 42 may calculate, as the pulse-peak-voltage variation value for the second welding wire 19b, a multiplication value (see Equation (7)), which is obtained by multiplying the error between the value of the voltage detected at the second welding wire 19b and the voltage target value for the second welding wire 19b by a constant that is set in advance, an integral value (see Equation (8)), which is obtained by integrating the multiplication values with respect to time, or an addition value (see Equation (9)), which is obtained by adding the multiplication value to the integral value.

$$\Delta Vp2 = \gamma_1(Vf2 - V2\text{set}) \tag{7}$$

$$\Delta Vp2 = \gamma_2 \int (Vf2 - V2\text{set}) dt \tag{8}$$

$$\Delta Vp2 = \gamma_3(Vf2 - V2\text{set}) + \gamma_4 \int (Vf2 - V2\text{set}) dt \tag{9}$$

Note that $\Delta Vp2$ is the pulse-peak-voltage variation value for the second welding wire 19b. Vf2 is the value of the voltage detected at the second welding wire 19b. V2set is the voltage target value for the second welding wire 19b. $\gamma_1$ to $\gamma_4$ are constants. Furthermore, t denotes a time that has elapsed after control of the length of the arc started. In other words, $\int dt$ corresponds to time integral in the present invention. Regarding the constants $\gamma_1$ to $\gamma_4$, for example, welding experiments are performed, and the constants $\gamma_1$ to $\gamma_4$ are calculated in consideration of the amount of spatter that occurs and the stability of arc welding.

Furthermore, in this case, the error amplifier 42 may calculate, as the pulse-base-voltage variation value for the second welding wire 19b, a multiplication value (see Equation (10)), which is obtained by multiplying the error between the value of the voltage detected at the second welding wire 19b and the voltage target value for the second welding wire 19b by a constant that is set in advance, an integral value (see Equation (11)), which is obtained by integrating the multiplication values with respect to time, or an addition value (see Equation (12)), which is obtained by adding the multiplication value to the integral value.

$$\Delta Vb2 = \epsilon_1(Vf2 - V2\text{set}) \tag{10}$$

$$\Delta Vb2 = \epsilon_2 \int (Vf2 - V2\text{set}) dt \tag{11}$$

$$\Delta Vb2 = \epsilon_3(Vf2 - V2\text{set}) + \epsilon_4 \int (Vf2 - V2\text{set}) dt \tag{12}$$

Note that $\Delta Vb2$ is the pulse-base-voltage variation value for the second welding wire 19b. $\epsilon_1$ to $\epsilon_4$ are constants. Furthermore, t denotes a time that has elapsed after control of the length of the arc started. In other words, $\int dt$ corresponds to time integral in the present invention. The constants $\epsilon_1$ to $\epsilon_4$ can be calculated as in the case of the constants $\gamma_1$ to $\gamma_4$, and may be values the same as the constants $\gamma_1$ to $\gamma_4$. Alternatively, the constants $\epsilon_1$ to $\epsilon_4$ may be values different from the constants $\gamma_1$ to $\gamma_4$.

A pulse-peak-voltage-reference-value setting circuit (pulse-peak-output-reference-value setting means) 43 outputs a pulse-peak-voltage reference value, which is set in advance, for the second welding wire 19b. Here, the pulse-peak-voltage-reference-value setting circuit 43 outputs, to the adder 44, a pulse-peak-voltage-reference-value setting signal indicating the pulse-peak-voltage reference value for the second welding wire 19b. The pulse-peak-voltage-reference-value setting signal for the second welding wire 19b indicates a reference value of the welding voltage at the second welding wire 19b in the pulse peak period.

Here, regarding the pulse-peak-voltage reference value, for example, welding experiments are performed, and the pulse-peak-voltage reference value is calculated in consideration of the amount of spatter that occurs and the easiness of arc welding. More specifically, the pulse-peak-voltage reference value is calculated on the basis of the properties of a material of the second welding wire 19*b*, the diameter of the second welding wire 19*b*, the type of shielding gas (for example, carbon dioxide gas, argon gas, a mixture gas of carbon dioxide gas and argon gas), the voltage target value for the second welding wire 19*b*, the speed at which the second welding wire 19*b* is fed, or the pulse cycle for the first welding wire 19*a*.

The adder (pulse-peak-output-value calculating means) 44 adds the pulse-peak-voltage variation value for the second welding wire 19*b* to the pulse-peak-voltage reference value for the second welding wire 19*b*, thereby calculating a pulse-peak-voltage value for the second welding wire 19*b*. Here, the adder 44 adds the pulse-peak-voltage-reference-value setting signal, which has been output by the pulse-peak-voltage-reference-value setting circuit 43, to the pulse-peak-voltage-variation-value signal, which has been output by the error amplifier 42. The adder 44 outputs, to a pulse-waveform selection circuit 40C, a pulse-peak-voltage setting signal indicating the pulse-peak-voltage value. The pulse-base-voltage-reference-value setting circuit (pulse-base-output-reference-value setting means) 45 outputs a pulse-base-voltage reference value, which is set in advance, for the second welding wire 19*b*. Here, the pulse-base-voltage-reference-value setting circuit 45 outputs, to the adder 46, a pulse-base-voltage-reference-value setting signal indicating the pulse-base-voltage reference value for the second welding wire 19*b*. In this case, the pulse-base-voltage reference value is calculated and set as in the case of the pulse-peak-voltage reference value. The pulse-base-voltage-reference-value setting signal for the second welding wire 19*b* indicates a reference value of the welding voltage at the second welding wire 19*b* in the pulse base period.

The adder (pulse-base-output-value calculating means) 46 adds the pulse-base-voltage variation value for the second welding wire 19*b* to the pulse-base-voltage reference value for the second welding wire 19*b*, thereby calculating a pulse-base-voltage value for the second welding wire 19*b*. Here, the adder 46 adds the pulse-base-voltage-reference-value setting signal, which has been output by the pulse-base-voltage-reference-value setting circuit 45, to the pulse-base-voltage-variation-value signal, which has been output by the error amplifier 42. The adder 46 outputs, to the pulse-waveform selection circuit 40C, a pulse-base-voltage setting signal indicating the pulse-base-voltage value.

When the pulse cycle signal indicates the pulse peak period, the pulse-waveform selection circuit (second pulse-waveform selection means) 40C outputs the pulse-peak-voltage value for the second welding wire 19*b*. In addition, when the pulse cycle signal indicates the pulse base period, the pulse-waveform selection circuit 40C outputs the pulse-base-voltage value for the second welding wire 19*b*. Here, when the pulse cycle signal indicates the pulse peak period for the first welding wire 19*a*, the pulse-waveform selection circuit 40C outputs, to the output control circuit 35*b*, the pulse-peak-voltage setting signal, which has been output by the adder 44, as a voltage control setting signal for the second welding wire 19*b*. In contrast, when the pulse cycle signal indicates the pulse base period for the first welding wire 19*a*, the pulse-waveform selection circuit 40C outputs, to the output control circuit 35*b*, the pulse-base-voltage setting signal, which has been output by the adder 46, as the voltage control setting signal for the second welding wire 19*b*.

The output control circuit 35*b* outputs the voltage control setting signal, which has been output by the pulse-waveform selection circuit 40C, to the inverter 14*b*. Here, by outputting the voltage control setting signal to the inverter 14*b*, the output control circuit 35*b* causes the inverter 14*b* to vary the welding voltage, i.e., controls the welding voltage at the second welding wire 19*b*. As described above, the output control circuit 35*b* varies the average value of the welding voltage at the second welding wire 19*b* by controlling a voltage value for the second welding wire 19*b*, whereby the length of the arc for the second welding wire 19*b* can be controlled.

Note that, regarding the waveform control section 1C, because configurations of the individual elements except for the output control circuit 35*b*, the pulse-waveform selection circuit 40C, the error amplifier 42, the pulse-peak-voltage-reference-value setting circuit 43, the adder 44, the pulse-base-voltage-reference-value setting circuit 45, and the adder 46 are similar to those of the elements of the waveform control section 1 illustrated in FIG. 2, descriptions thereof are omitted.

[Control of Welding Voltage at Second Welding Wire (Trailing Electrode)]

Figure 7:
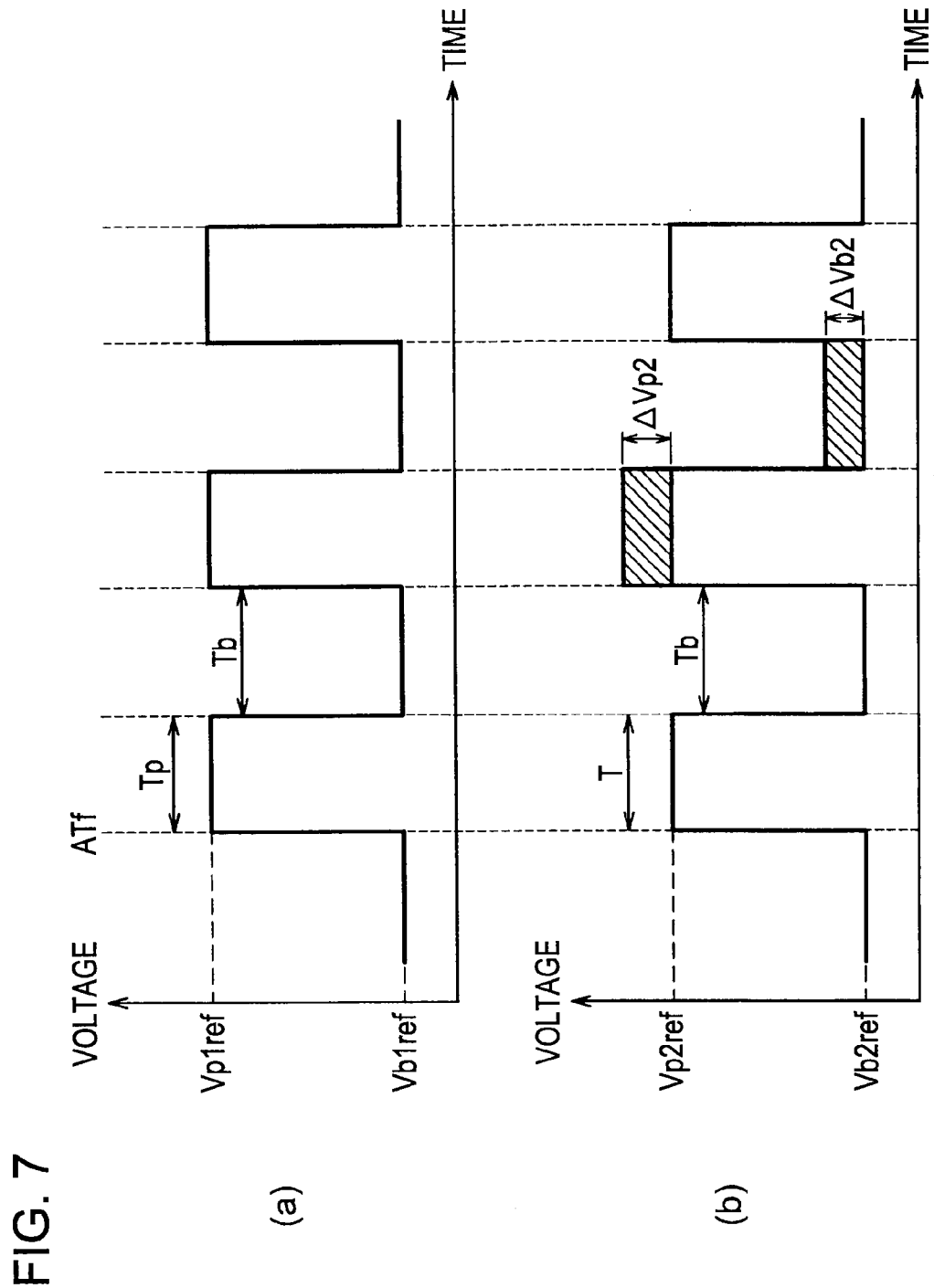
FIG. 7 includes parts (a) and (b) that are graphs for explaining control, which is performed by a waveform control section illustrated in FIG. 6, of a voltage at the second welding wire, part (a) being a graph illustrating the relationships between a voltage at the first welding wire and time, part (b) being a graph illustrating the relationships between the voltage at the second welding wire and time.

Hereinafter, control of the voltage at the second welding wire in the present invention will be described in detail with reference to FIG. 7 (appropriately with reference to FIG. 2). In FIG. 7, the pulse cycle signal is denoted by ATf. The pulse peak period is denoted by Tp. The pulse base period is denoted by Tb. The pulse-peak-voltage reference value for the first welding wire 19*a* is denoted by Vp1ref. The pulse-base-voltage reference value for the first welding wire 19*a* is denoted by Vb1ref. The pulse-peak-voltage reference value for the second welding wire 19*b* is denoted by Vp2ref. The pulse-base-voltage reference value for the second welding wire 19*b* is denoted by Vb1ref. Furthermore, in part (b) of FIG. 7, the voltage is increased only by the pulse-peak-voltage variation value $\Delta Vp2$ and the pulse-base-voltage variation value $\Delta Vb2$, and portions of increased voltage that correspond to the pulse-peak-voltage variation value $\Delta Vp2$ and the pulse-base-voltage variation value $\Delta Vb2$ are illustrated using hatching.

As illustrated in FIG. 7, the waveform control section 1C performs control so that the pulse cycle for the second welding wire 19*b* will be synchronized with the pulse cycle for the first welding wire 19*a* at the pulse cycle signal ATf, i.e., so that the pulse peak period Tp for the first welding wire 19*a* will coincide with the pulse peak period Tp for the second welding wire 19*b* and the pulse base period Tb for the first welding wire 19*a* will coincide with the pulse base period Tb for the second welding wire 19*b*.

There is a case in which, using the waveform control section 1C, it is desired to increase the average value of the welding voltage at the second welding wire 19*b* because of, for example, maintenance of the welding quality. However, an appropriate welding voltage may not be obtained simply by increasing the pulse-peak-voltage reference value Vp2ref for the second welding wire 19*b* as in the case of the related art, because the average value of the welding voltage at the second welding wire 19*b* is low. Furthermore, a certain upper limit of the pulse-peak-voltage reference value Vp2ref is defined for the second welding wire 19*b*, and the pulse-peak-voltage reference value Vp2ref cannot be unlimitedly increased. For this reason, the waveform control section 1C increases the pulse-base-voltage reference value Vb2ref for the second welding wire 19*b* only by the pulse-base-voltage variation value $\Delta Vb2$, thereby increasing the average value of the welding voltage at the second welding wire 19*b*. In this manner, the waveform control section 1C can obtain an appropriate welding voltage at the second welding wire 19*b*.

The waveform control section 1C can decrease the average value of the welding voltage at the second welding wire 19*b* by decreasing the pulse-peak-voltage reference value Vp2ref for the second welding wire 19b only by the pulse-peak-voltage variation value ΔVp2 and by decreasing the pulse-base-voltage reference value Vb2ref for the second welding wire 19b only by the pulse-base-voltage variation value ΔVb2.

[Operation of Waveform Control Section]

Figure 8:
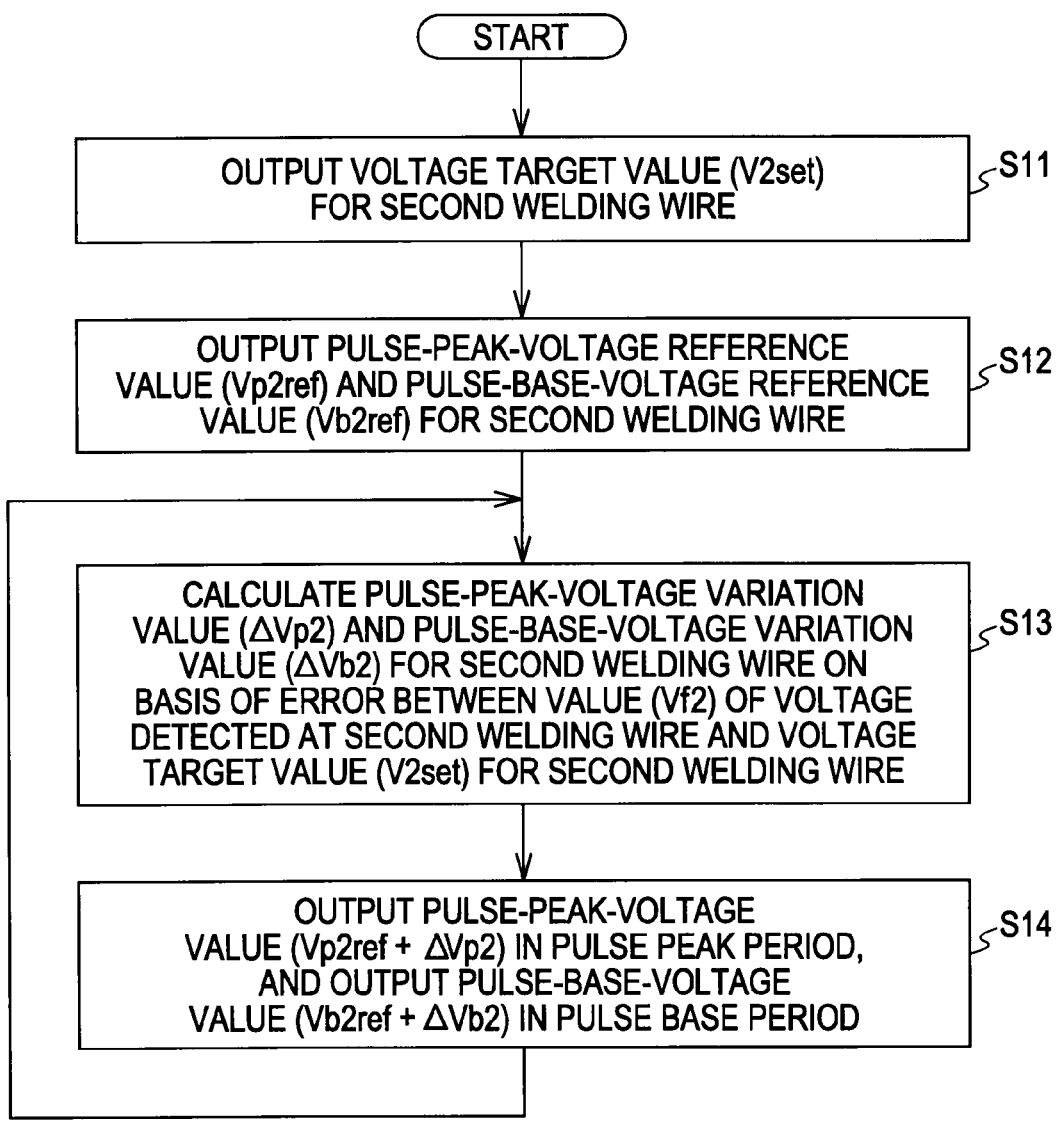
FIG. 8 is a flowchart illustrating an operation, which is performed by the waveform control section illustrated in FIG. 6, of controlling the voltage at the second welding wire.

Hereinafter, an operation of the waveform control section 1C will be described in detail with reference to FIG. 8 (appropriately with reference to FIG. 6). FIG. 8 is a flowchart illustrating the operation, which is performed by the waveform control section 1C illustrated in FIG. 6, of controlling the voltage at the second welding wire. Operations that are not associated with control of the voltage at the second welding wire are omitted.

The waveform control section 1C causes the voltage setting unit 24b to output the voltage target value (V2set) for the second welding wire 19b to the error amplifier 42 (step S11). Furthermore, the waveform control section 1C causes the pulse-peak-voltage-reference-value setting circuit 43 to output the pulse-peak-voltage reference value (Vp2ref) for the second welding wire 19b, and causes the pulse-base-voltage-reference-value setting circuit 45 to output the pulse-base-voltage reference value (Vb2ref) for the second welding wire 19b (step S12).

After the process in step S12 is performed, the waveform control section 1C causes the error amplifier 42 to calculate the pulse-peak-voltage variation value (ΔVp2) for the second welding wire 19b and the pulse-base-voltage variation value (ΔVb2) for the second welding wire 19b on the basis of the error between the value (Vf2) of the voltage detected at the second welding wire 19b and the voltage target value (V2set) for the second welding wire 19b (step S13).

After the process in step S13 is performed, the waveform control section 1C causes the pulse-waveform selection circuit 40C to output the pulse-peak-voltage value (Vp2ref+ΔVp2) for the second welding wire 19b when the pulse cycle signal indicates the pulse peak period, and causes the pulse-waveform selection circuit 40C to output the pulse-base-voltage value (Vb2ref+ΔVb2) for the second welding wire 19b when the pulse cycle signal indicates the pulse base period (step S14).

As described above, the waveform control section 1C in the third embodiment controls the pulse-peak-voltage value for the second welding wire 19b and the pulse-base-voltage value for the second welding wire 19b in tandem pulse arc welding in which the pulse cycles are synchronized with each other, whereby the range of variation in the average value of the welding voltage at the second welding wire 19b can be increased. Thus, because the average value of the welding voltage at the second welding wire 19b can be optimized, a high welding quality is realized.

Fourth Embodiment

Control of Voltage and Delay Processing

[Configuration of Waveform Control Section]

Figure 9:
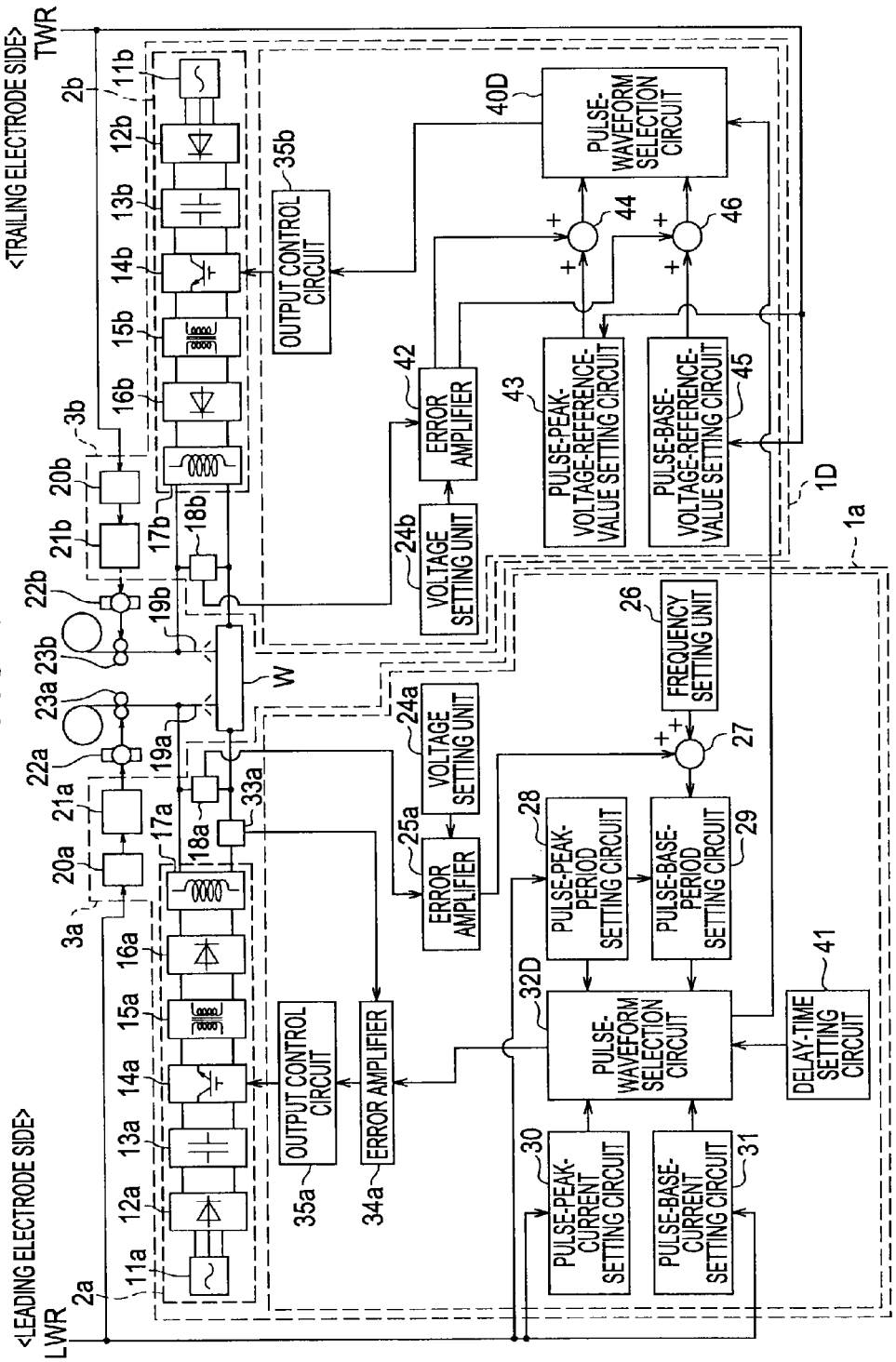
FIG. 9 is a block diagram of a configuration of a tandem pulse arc welding control apparatus according to a fourth embodiment of the present invention.

Regarding a configuration of a waveform control section in the fourth embodiment, the differences between the waveform control section and the waveform control section 1C in the third embodiment will be mainly described with reference to FIG. 9. A large difference of a waveform control section 1D from the waveform control section 1C illustrated in FIG. 6 is that the pulse cycle for the first welding wire 19a and the pulse cycle for the second welding wire 19b are made to have a phase difference, which is set in advance, therebetween. Accordingly, the above-described delay-time setting circuit 41 is added to the waveform control section 1C illustrated in FIG. 6, thereby realizing a configuration associated with the waveform control section 1D as illustrated in FIG. 9.

Figure 5:
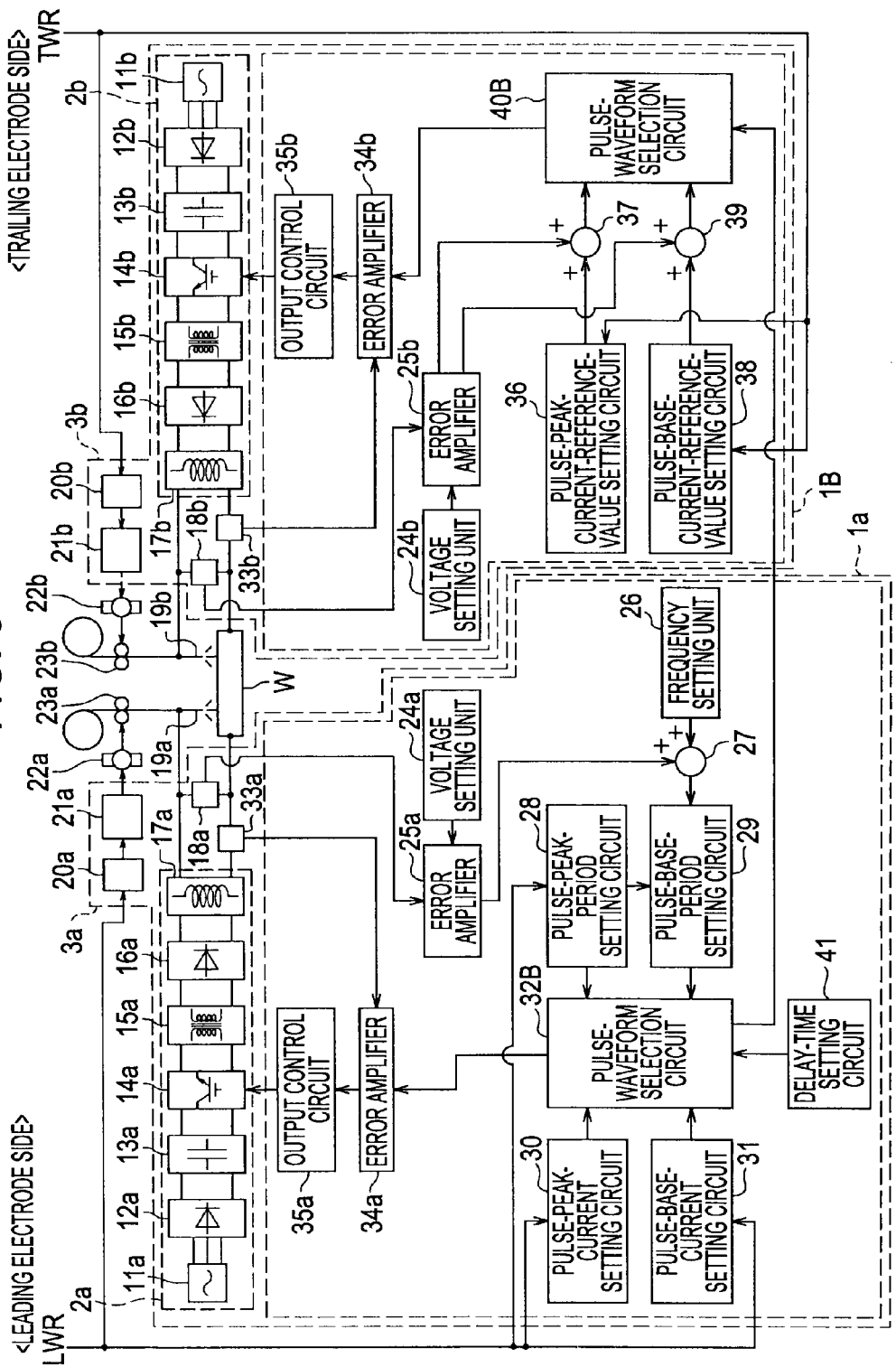
FIG. 5 is a block diagram of a configuration of a tandem pulse arc welding control apparatus according to a second embodiment of the present invention.

A pulse-waveform selection circuit 32D is similar to the pulse-waveform selection circuit 32B illustrated in FIG. 5.

Because the pulse cycle signal is made to have the phase difference and is input to a pulse-waveform selection circuit 40D, the pulse-waveform selection circuit 40D delays the voltage control setting signal by the phase difference, and outputs the voltage control setting signal to the output control circuit 35b. The pulse-waveform selection circuit 40D is similar to the pulse-waveform selection circuit 40C illustrated in FIG. 6 except that the pulse-waveform selection circuit 40D delays and outputs the voltage control setting signal.

Figure 6:
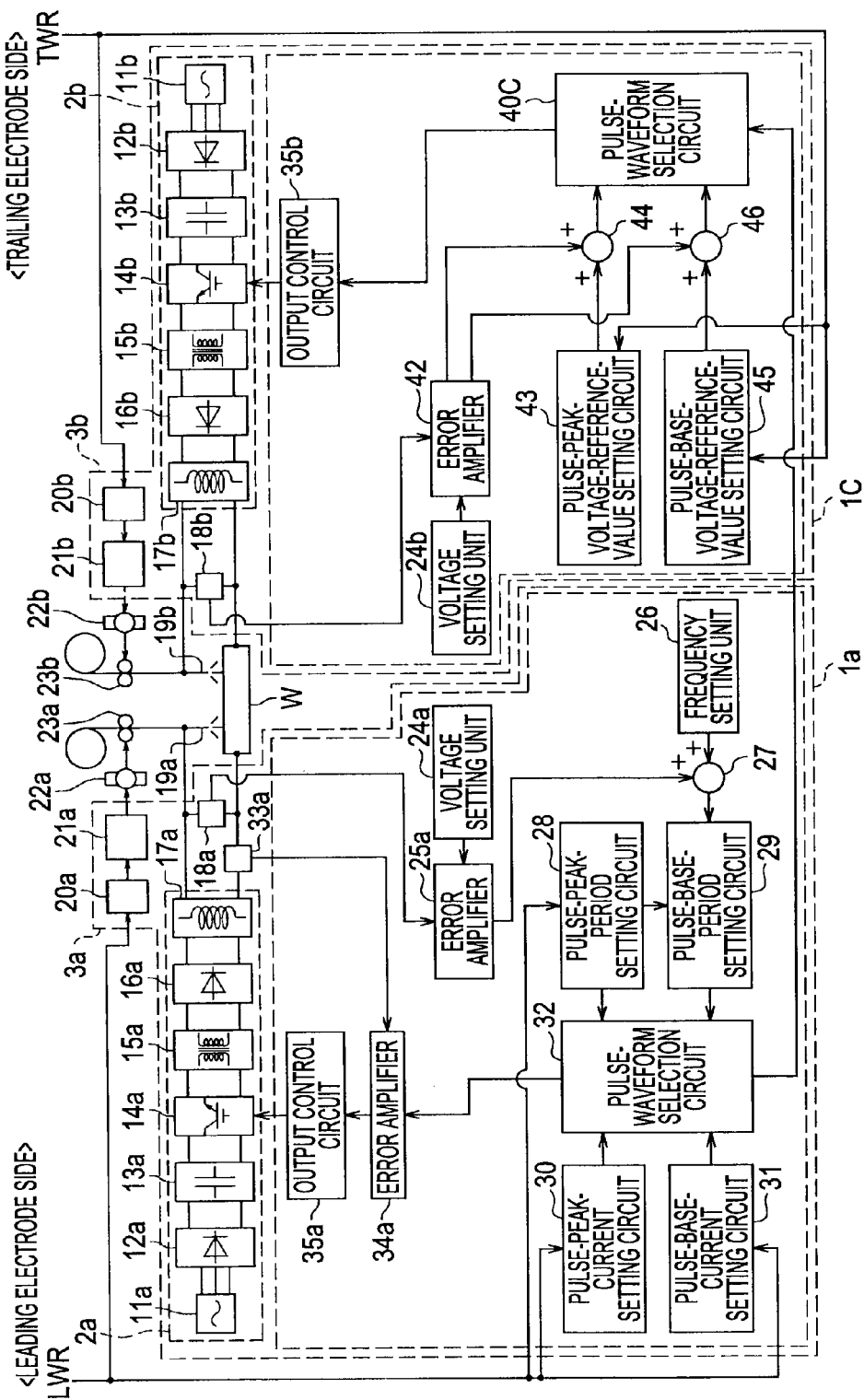
FIG. 6 is a block diagram of a configuration of a tandem pulse arc welding control apparatus according to a third embodiment of the present invention.

Regarding the waveform control section 1D, because configurations of the individual elements except for the delay-time setting circuit 41 and the pulse-waveform selection circuit 32B are similar to those of the elements of the waveform control section 1C illustrated in FIG. 6, descriptions thereof are omitted. Furthermore, regarding the waveform control section 1D, because an operation of controlling the voltage at the second welding wire is similar to the operation illustrated in FIG. 8, a description thereof is omitted.

As described above, the waveform control section 1D in the fourth embodiment controls the pulse-peak-voltage value for the second welding wire 19b and the pulse-base-voltage value for the second welding wire 19b in tandem pulse arc welding in which the pulse cycles are made to have a delay therebetween, whereby the range of variation in the average value of the welding voltage at the second welding wire 19b can be increased. Thus, a high welding quality can be realized.

Note that, in the third and fourth embodiments, an example is described, in which both the pulse-peak-voltage value for the second welding wire 19b and the pulse-base-voltage value for the second welding wire 19b are controlled. However, the waveform control section in the present invention can control only either one of the pulse-peak-voltage value for the second welding wire 19b and the pulse-base-voltage value for the second welding wire 19b.

What is claimed is:

1. A tandem pulse arc welding control apparatus in which a pulse cycle for a first welding wire and a pulse cycle for a second welding wire insulated from the first welding wire are synchronized with each other, the tandem pulse arc welding control apparatus comprising:

voltage detection means for detecting a voltage at the second welding wire, and for outputting a value of the voltage detected at the second welding wire;

voltage-target-value setting means for outputting a voltage target value, which is set in advance, for the second welding wire;

pulse-peak-output-reference-value setting means for outputting a pulse-peak-output reference value, which is set in advance, for the second welding wire;

pulse-base-output-reference-value setting means for outputting a pulse-base-output reference value, which is set in advance, for the second welding wire;

output-variation-value calculating means for calculating a pulse-peak-output variation value for the second welding wire and a pulse-base-output variation value for the second welding wire on the basis of a difference between the value of the voltage detected at the second welding wire and the voltage target value for the second welding wire;

pulse-peak-output-value calculating means for calculating a pulse-peak-output value for the second welding wire by adding the pulse-peak-output variation value for the second welding wire to the pulse-peak-output reference value for the second welding wire;

pulse-base-output-value calculating means for calculating a pulse-base-output value for the second welding wire by adding the pulse-base-output variation value for the second welding wire to the pulse-base-output reference value for the second welding wire;

second pulse-waveform selection means, into which a pulse cycle signal indicating whether the first welding wire is in a pulse peak period or a pulse base period is input, for outputting the pulse-peak-output value for the second welding wire when the pulse cycle signal indicates the pulse peak period, and for outputting the pulse-base-output value for the second welding wire when the pulse cycle signal indicates the pulse base period; and output control means for controlling an output value for the second welding wire on the basis of the pulse-peak-output value for the second welding wire and the pulse-base-output value for the second welding wire, which have been output by the second pulse-waveform selection means.

2. The tandem pulse arc welding control apparatus according to claim 1,
wherein the pulse-peak-output reference value for the second welding wire is a pulse-peak-current reference value for the second welding wire,
wherein the pulse-base-output reference value for the second welding wire is a pulse-base-current reference value for the second welding wire,
wherein the pulse-peak-output variation value for the second welding wire is a pulse-peak-current variation value for the second welding wire,
wherein the pulse-base-output variation value for the second welding wire is a pulse-base-current variation value for the second welding wire,
wherein the pulse-peak-output value for the second welding wire is a pulse-peak-current value for the second welding wire,
wherein the pulse-base-output value for the second welding wire is a pulse-base-current value for the second welding wire, and
wherein the output value for the second welding wire is a current value for the second welding wire.

3. The tandem pulse arc welding control apparatus according to claim 1,
wherein the pulse-peak-output reference value for the second welding wire is a pulse-peak-voltage reference value for the second welding wire,
wherein the pulse-base-output reference value for the second welding wire is a pulse-base-voltage reference value for the second welding wire,
wherein the pulse-peak-output variation value for the second welding wire is a pulse-peak-voltage variation value for the second welding wire,
wherein the pulse-base-output variation value for the second welding wire is a pulse-base-voltage variation value for the second welding wire,
wherein the pulse-peak-output value for the second welding wire is a pulse-peak-voltage value for the second welding wire,
wherein the pulse-base-output value for the second welding wire is a pulse-base-voltage value for the second welding wire, and
wherein the output value for the second welding wire is a voltage value for the second welding wire.

4. The tandem pulse arc welding control apparatus according to claim 1,
wherein the pulse cycle for the first welding wire and the pulse cycle for the second welding wire are made to have a phase difference, which is set in advance, therebetween, and
wherein the pulse cycle signal, which indicates whether the first welding wire is in the pulse peak period or the pulse base period, is made to have the phase difference, and is input to the second pulse-waveform selection means.

5. The tandem pulse arc welding control apparatus according to claim 1, wherein the output-variation-value calculating means calculates, as each of the pulse-peak-output variation value for the second welding wire and the pulse-base-output variation value for the second welding wire, a multiplication value, which is obtained by multiplying the difference between the value of the voltage detected at the second welding wire and the voltage target value for the second welding wire by a constant that is set in advance, an integral value, which is obtained by integrating the multiplication values with respect to time, or an addition value, which is obtained by adding the multiplication value to the integral value.

6. The tandem pulse arc welding control apparatus according to claim 1,
wherein the pulse-peak-output-reference-value setting means outputs the pulse-peak-output reference value that is set in advance on the basis of properties of a material of the second welding wire, a diameter of the second welding wire, a type of shielding gas, the voltage target value for the second welding wire, a speed at which the second welding wire is fed, or the pulse cycle for the first welding wire, and
wherein the pulse-base-output-reference-value setting means outputs the pulse-base-output reference value that is set in advance on the basis of the properties of the material of the second welding wire, the diameter of the second welding wire, the type of shielding gas, the voltage target value for the second welding wire, the speed at which the second welding wire is fed, or the pulse cycle for the first welding wire.

7. The tandem pulse arc welding control apparatus according to claim 1, wherein the output control means varies a value of a welding voltage at the second welding wire by controlling the pulse-peak-output value and the pulse-base-output value for the second welding wire, thereby controlling a length of an arc for the second welding wire.

8. A tandem pulse arc welding system comprising:
a welding robot including a first welding wire and a second welding wire that is insulated from the first welding wire;
a welding robot controller that controls the welding robot;
welding power supplies that supply welding voltages to the first welding wire and the second welding wire; and
the tandem pulse arc welding control apparatus according to claim 1 that controls the welding voltage which has been output by the corresponding welding power supply to the second welding wire.

* * * * *